(12) United States Patent
Hallberg et al.

(10) Patent No.: US 10,434,516 B2
(45) Date of Patent: Oct. 8, 2019

(54) SPIDER WALL SHIELD

(71) Applicant: SANDVIK INTELLECTUAL PROPERTY AB, Sandviken (SE)

(72) Inventors: Anders Hallberg, Sodra Sandby (SE); Mikael M. Larsson, Eslov (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 270 days.

(21) Appl. No.: 15/517,873

(22) PCT Filed: Oct. 9, 2014

(86) PCT No.: PCT/EP2014/071635
§ 371 (c)(1),
(2) Date: Apr. 7, 2017

(87) PCT Pub. No.: WO2016/055110
PCT Pub. Date: Apr. 14, 2016

(65) Prior Publication Data
US 2017/0304831 A1 Oct. 26, 2017

(51) Int. Cl.
*B02C 2/00* (2006.01)
*B02C 2/06* (2006.01)
*F16D 65/00* (2006.01)
*F16D 55/00* (2006.01)

(52) U.S. Cl.
CPC .................. *B02C 2/06* (2013.01); *B02C 2/00* (2013.01); *F16D 65/00* (2013.01); *F16D 2055/0037* (2013.01)

(58) Field of Classification Search
CPC .................................... B02C 2/00; B02C 2/06
USPC ......................................................... 241/209
See application file for complete search history.

(56) References Cited

U.S. PATENT DOCUMENTS

| 2,489,936 | A | 11/1949 | Shafter |
| 2,832,547 | A | 4/1958 | Kennedy |
| 3,026,051 | A | 3/1962 | Saari |
| 8,070,084 | B2 * | 12/2011 | Biggin ...................... B02C 2/06 241/209 |
| 2002/0088888 | A1 | 7/2002 | Van Mullem |
| 2011/0192927 | A1 * | 8/2011 | Biggin ...................... B02C 2/04 241/213 |

FOREIGN PATENT DOCUMENTS

| EP | 2532429 A1 | 12/2012 |
| SU | 638360 A1 | 12/1978 |
| SU | 1209280 A1 | 2/1986 |
| WO | 2014125162 A1 | 8/2014 |

* cited by examiner

*Primary Examiner* — Faye Francis
(74) *Attorney, Agent, or Firm* — Corinne R. Gorski (57) ABSTRACT

A gyratory crusher spider wall shield for releasable mounting to a radially inward facing face of a spider positioned on top of a shell of a gyratory crusher includes a primary protection wall positionable over the inward face of the spider and a rear wall attachable to an outer annular fixating ring positionable axially intermediate a material input hopper and the spider.

14 Claims, 10 Drawing Sheets

SPIDER WALL SHIELD

RELATED APPLICATION DATA

This application is a § 371 National Stage Application of PCT International Application No. PCT/EP2014/071635 filed Oct. 9, 2014.

FIELD OF INVENTION

The present invention relates to a gyratory crusher spider protection shield and in particular, although not exclusively, to a spider wall shield configured for mounting and dismounting at a spider wall so as to protect the wall from material to be crushed as it falls into the crushing zone.

BACKGROUND ART

Gyratory crushers are used for crushing ore, mineral and rock material to smaller sizes. Typically, the crusher comprises a crushing head mounted upon an elongate main shaft. A first crushing shell (referred to as a mantle) is mounted on the crushing head and a second crushing shell (referred to as a concave) is mounted on a frame such that the first and second shells define together a crushing chamber through which the material to be crushed is passed. A driving device positioned at a lower region of the main shaft is configured to rotate an eccentric assembly positioned about the shaft to cause the crushing head to perform a gyratory pendulum movement and crush the material introduced in the crushing chamber.

The main shaft is supported at its uppermost end by a top bearing housed within a central hub that forms a part of a spider assembly mounted on top of the topshell frame part. Spider arms project radially outward from the central hub to contact an outer rim at the top shell. The material to be crushed typically falls through the region between the spider arms and is prevented from causing damage to the arms by shields. Example shields are disclosed in U.S. Pat. Nos. 2,489,936; 2,832,547; 3,026,051; US 2002/0088888; US 2011/0192927. Such shields are typically secured to the spider arm via attachment bolts that project axially downward relative to the longitudinal axis of the main shaft. However, such configurations are disadvantageous as the bolt heads are exposed to the crushable material as it falls into the crushing chamber. With use, the bolt heads become damaged leading to attachment failure and subsequent loss of the shield that falls downwardly into the crushing chamber.

An alternative method of shield attachment involves welding the guards to the uppermost region of the spider arms. However, the welding process is both labour and time intensive and introduces additional problems when the worn shield needs removing. Additionally, the welding creates tension and stress concentrations into the spider arms.

Moreover, each of the spider arm shield is required to be raised independently for replacement or servicing. Accordingly, an auxiliary lifting crane is required to repeat lifting and lowering cycles to completely service the spider protection assembly. What is required is a spider protection shield that addresses the above problems.

SUMMARY OF THE INVENTION

It is an objective of the present invention to provide a modular spider protection shield for positioning over regions of the spider to protect it from crushable material falling into the crusher. It is a further specific objective to provide a shield or guard for a radially inward facing surface of the spider that may be conveniently attached to and dismounted at the spider without compromising the physical and mechanical integrity of the spider (including the spider arms) to both locate and fixate the shield protection assembly at the spider. It is a further specific objective to obviate the need for adapting the spider so as to mount the protection assembly including for example welding lugs or the creation of boreholes within the spider that are required typically for conventional protection systems. It is a further objective to minimise the time required to repair and service the spider shields by minimising the raising and lowering cycles of an auxiliary lifting crane.

The objectives are achieved by providing a modular spider shield assembly and in particular a spider wall shield that is configured to be mounted against the radially inward facing wall of the spider and capable of being mechanically attached to the spider via an intermediate positioned fixating ring that is in turn fixed to the spider. Accordingly, the present shield is not mechanically attached directly to the spider. As such, the requirement for welding or bolting directly to the spider wall (or indeed the spider arms) is avoided. This is advantageous to preserve the strength characteristics of the spider and avoid the creation of stress concentrations resultant from welding or the creation of boreholes within the spider used with conventional systems.

Preferably, a protection assembly is provided in which a plurality of spider wall shields project radially inward from a surrounding fixating ring to which the shields are attachable to form a unitary body that may be raised and lowered as a single unit with the spider relative to the crusher. Accordingly, the servicing and maintenance time required is significantly reduced relative to conventional arrangements. The spider shields are positioned so as to extend and protect the region of the spider wall that extends circumferentially between the spider arms. The present protection assembly may further comprise spider arm shields also demountably attached to the fixating ring and configured for positioning over and about each of the diametrically opposed spider arms so as to form a complete assembly positioned to protect the radially inner and upward facing surfaces of the spider from material falling from an axially upper feed hopper to the axially lower crusher (relative to the spider).

Positioning the fixating ring at a perimeter of the spider is convenient so as to not obstruct the material flow path into the crusher and avoid or minimise wear of the fixating ring due to the falling material. The fixating ring may be conveniently attached via mounting bolts secured to an upper perimeter region of the spider that is used to mount the feed hopper. Accordingly, the present fixating ring comprises a lower annular flange for mounting to the spider and an upper annular flange for mounting to a feed hopper. Accordingly, the present fixating ring is configured to sit axially intermediate the spider and hopper.

Advantageously, the present spider protection assembly may be assembled at the spider remote from the crusher and then lowered into position as a single unit for attachment onto the crusher. A worn shield of the assembly may then be independently removed from the crusher if prematurely worn or the entire spider and protection assembly may be removed via a single lifting operation with a replacement assembly lowered into position immediately afterwards to minimise the maintenance time required.

According to a first aspect of the present invention there is provided a gyratory crusher spider wall shield for releasable mounting to a radially inward facing face of a spider positioned on a top shell of a gyratory crusher, the wall shield comprising: a spider protection wall positionable over the inward face of the spider; characterised by: a rear wall extending upwardly from and projecting transverse to the protection wall, the rear wall having an inner face orientated radially inwards and an outer face orientated radially outward, the rear wall representing a radially outermost part of the wall shield; and at least one attachment element provided at the rear wall to attach the wall shields to a fixating ring via the outer face, the fixating ring positionable on top of and at a perimeter of the spider to surround at least part of the spider and the arm shield.

Preferably, the wall shield further comprises at least one locating foot projecting downwardly from a lower portion of the rear wall to contact an upper region of the spider. Preferably, the wall shield further comprises at least one locating foot projecting downwardly from the spider protection wall to contact the inward face of the spider. Such an arrangement is advantageous to easily and reliably seat the shield onto the spider such that the shield is maintained in contact position with the spider without the need for welding, fixating lugs or bolts. Preferably the shield is secured by mechanical attachment indirectly to the spider through the fixating ring.

Preferably, the rear wall is curved along its length, the curvature corresponding to an arc of a circle. Preferably, the curvature corresponds approximately to a curvature of the cylindrical hopper wall and the annular rim of the spider on which the fixating ring is positioned and secured.

Optionally, the wall shield comprises a first and second locating foot provided respectively at a first and a second end of the rear wall. Circumferentially, separating the first and second locating foot is advantageous to distribute the weight of the shield over the spider for secure mounting.

Preferably, the attachment element comprises a hole. Preferably the wall shield comprises a first and a second hole positioned respectively towards or at each of the first and second end of the length of the rear wall. Separating circumferentially the regions of attachment of the shield to the fixating ring is beneficial to provide a robust fixation of the shield to the fixating ring so as to be resistant to bending or twisting forces imparted by the crushable material falling into the crusher. The holes are configured to receive shafts of anchorage bolts extending through the rear wall and corresponding holes provided at the fixating rings. Alternatively, the fixating ring may comprise projections, pins, lugs, bayonet fittings and the like to engage the holes of the rear wall to allow releasable attachment. As will be appreciated, the mechanism for releasable attachment at the shield at the fixating ring may comprise any form of mechanical attachment found in the art. Optionally, the shield may be releasably clipped onto the fixating ring or may be secured via resiliently biased members that may extend radially to interengage and provide a bridging connection between the fixating ring and the shield.

Preferably, the spider protection wall and the rear wall are formed integrally. Such an arrangement provides a mechanically strong construction to extend the longevity of the shield and to be resistant to the loading and impact forces encountered during use.

Preferably, a length of the wall shield in a circumferential direction decreases from an axially uppermost region positioned at the rear wall and an axially lowermost end positioned at the spider protection wall. Such a configuration enables the close side-by-side positioning of the shield (in a circumferential direction) between the spider arms so as to completely protect the inward facing surface of the spider between an axially upper and an axially lower edge of the spider.

Preferably, the rear wall further comprises an aperture, notch or hooked member to enable the shield to be connected to a lifting device. The rear wall represents an axially uppermost part of the protection shield and providing an aperture or means of engagement of the lifting device at the rear wall is convenient when attaching and dismounting the lifting device.

According to a second aspect of the present invention there is provided a gyratory crusher spider protection assembly comprising: a plurality of wall shields as claimed herein mountable over the inward face of the spider; a fixating ring positionable on top of and at the perimeter of the spider to extend circumferentially around at least part of the spider and the wall shields; and a plurality of fixation elements securable respectively to each of the attachment elements to releasably fix the wall shields to the fixating ring such that the wall shields and fixating ring are configured to form a unitary assembly.

Preferably, the protection assembly further comprises anchorage elements to secure the fixating ring to an upper region of the spider at the perimeter of the spider. The anchorage elements are preferably bolts extending axially between the fixating ring and the perimeter region of the spider. Preferably, the fixating ring comprises a lower annular flange for positioning on top of and in contact with an annular flange of the spider and an upper annular flange for contacting and supporting the material feed hopper. Preferably, both the hopper and lower annular flanges comprise circumferentially spaced boreholes to receive attachment bolts extending through both upper and lower flanges and into secure engagement with the axially lower spider and axially upper hopper.

Preferably, the assembly further comprises a plurality of locating feet extending downwardly from the rear walls to contact the upper region of the spider at the perimeter of the spider. The feet are beneficial to provide a secure seating of the shields onto the spider with the attachment to the fixating ring functioning to maintain the shields in position in use and to avoid the shield becoming dislodged when contacted by the crushable material falling into the crusher. However, the positioning of the feet that extend downwardly from the shield and into contact with the spider are configured to support the shield and maintain it in position as a free standing component independently of attachment to the fixating ring.

Preferably, the assembly further comprises a plurality spider arm shields for releasable mounting to a plurality of spider arms that extends radially outward from a central hub that forms a part of the spider, each one of the arm shields comprising: a tunnel having a roof and sidewalls for positioning over and at least partially around each spider arm to protect an upper and side faces of each arm, the tunnel having a radially inner end for positioning at the hub and a radially outer end for positioning at a perimeter of the spider; a rear wall projecting upwardly from the radially outer end of the tunnel, the rear wall having an inner face orientated radially inwards towards the tunnel and an outer face orientated radially outward away from the tunnel, the rear wall representing a radially outermost part of the arm shield; and a plurality of attachment elements provided at the rear wall to attach the arm shields to the fixating ring via the outer face, such that the arm shields, the wall shields and fixating ring are configured to form a unitary assembly.

The spider arm shields are configured to sit circumferentially intermediate the wall shields so as to form a generally annular and modular spider protection assembly covering the spider arms and radially inner face of the spider. Each of the arm and wall shields are removably mounted at the common fixating ring such that when attached, the assembly is formed as a single unitary body that may be conveniently raised and lowered in position with the spider via a single lifting and lowering operation.

Preferably, each arm shield further comprises at least one locating foot projecting downwardly from a lower portion of the rear wall radially behind the tunnel. The foot is configured to contact the upper perimeter region of the spider and provide a secure mounting of the arm shield onto the spider arm. The foot also facilitates correct alignment by guiding the arm shield into position when lowered by the lifting crane. Preferably, the arm shield further comprises at least one locating foot projecting downwardly from the roof of the tunnel for contacting the upper face of the arm. Accordingly, the arm shield is balanced securely onto the spider arm at both the radially inner and radially outer the ends via the radially inner and outer locating feet. The feet simply abut against the upper region of the arm and spider and do not require mechanical fixation that would be otherwise be problematic to remove or introduce stress concentrations to the arm or main body of the spider. Preferably, the arm shield comprises two radially outer feet extending downwardly from the rear wall and two radially inner feet extending downwardly from the tunnel roof to contact the upper face of the arm at a radially inner position.

According to a third aspect of the present invention there is provided a gyratory crusher comprising: a spider having: a central hub; and a plurality of spider arms extending radially outward from the hub towards an outer perimeter of the spider; a material feed hopper mounted axially above the spider; and a spider protection assembly as claimed herein; wherein the fixating ring is positioned axially intermediate the spider and the hopper.

The present crusher and spider protection assembly is advantageous via its mechanism of attachment of each individual shield to the fixating ring. Accordingly, the crusher is devoid of any welding to otherwise secure the arm and wall shields to the respective spider arms and the inward facing face of the spider such that the arm and wall shields are secured exclusively to the spider via the fixating ring.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
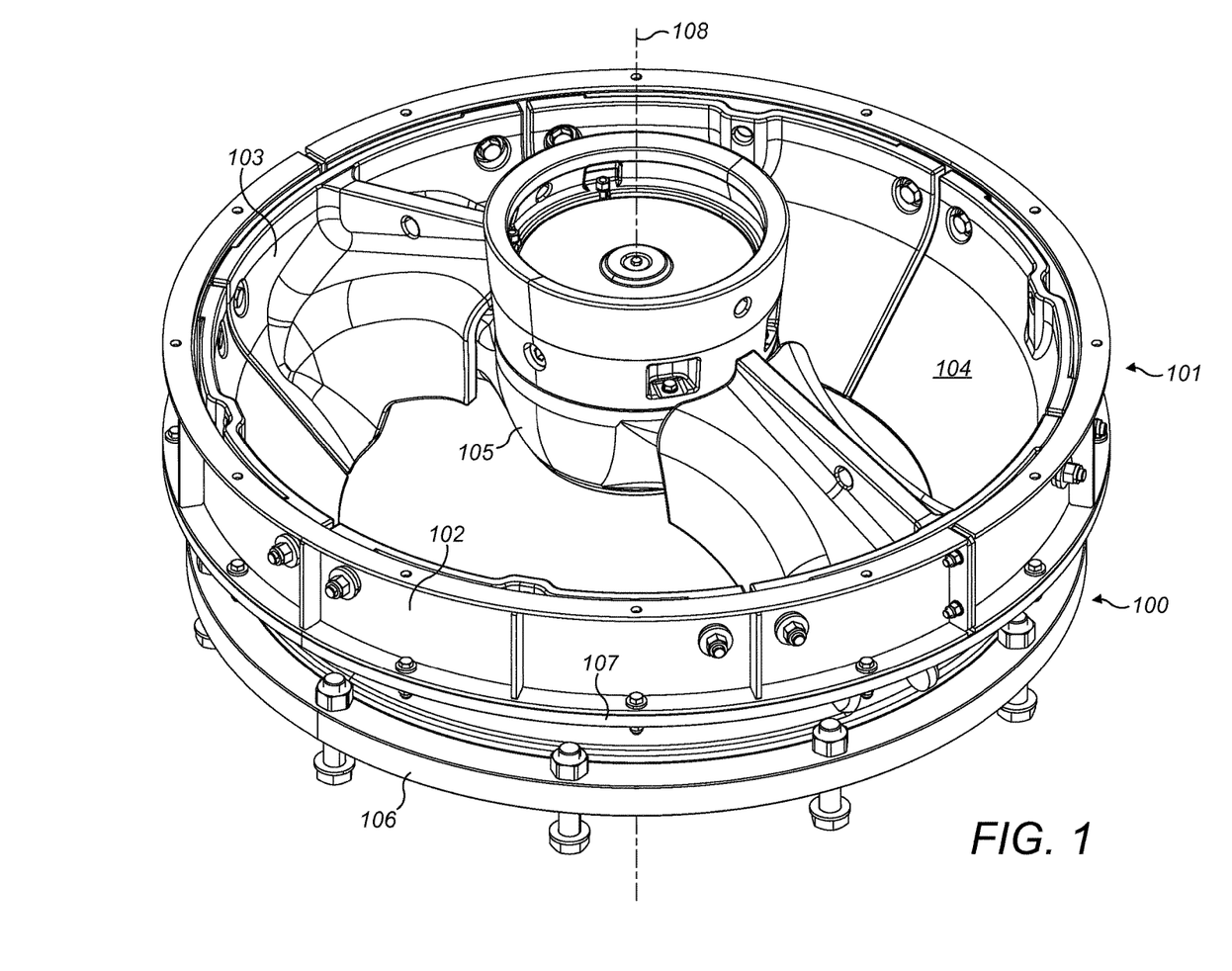
FIG. 1 is an upper external perspective view of a gyratory crusher spider protection assembly mounted in position over a spider according to a specific implementation of the present invention.
Figure 2:
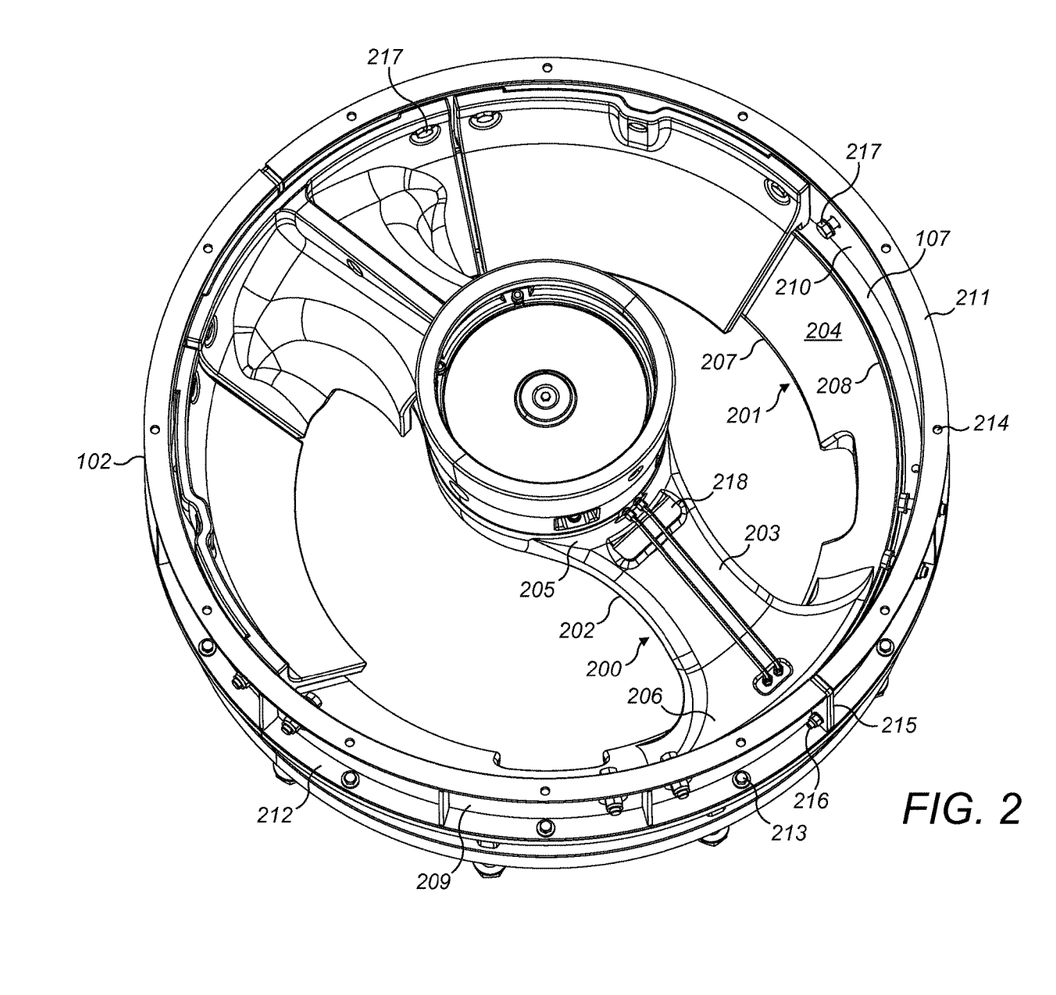
FIG. 2 is a further perspective view of the spider protection assembly of FIG. 1 mounted on the spider with selected components of the protection assembly removed for illustrative purposes.

Referring to FIGS. 1 and 2, a spider of a gyratory crusher is indicated generally by reference 100 and comprises a pair of diametrically opposed arms 200. Arms 200 extend radially outward from a central boss 105 centred on a longitudinal axis 108 extending through spider 100 and a gyratory crusher (not shown) mounted generally axially below spider 100. Each arm 200 comprises a radially innermost region 205 positioned at boss 105 and a radially outermost region 206 positioned at a spider wall indicated generally by reference 201. Each arm 200 therefore represents a bridge extending between boss 105 and an annular spider perimeter wall 201. Each arm 200 comprises a side face 202 an upper face 203 and an underside face (not shown) extending between radially inner and outer regions 205, 206.

Spider wall 201 is orientated to be angled or declined relative to longitudinal axis 108 such that an axially lowermost edge 207 is positioned closer to axis 108 than an axially upper annular edge/region 208. A radially inward facing surface 204 of spider wall 201 is orientated towards central boss 105 and extends circumferentially between spider arms 200.

Referring to FIGS. 1 to 4, the present spider protection assembly comprises a plurality of individual protection shields collectively secured to a common fixating ring that surrounds circumferentially each of the shields. In particular, protection assembly is indicated generally by reference 101 and comprises annular fixating ring 102, a plurality of spider wall shields 104 and a plurality of spider arm shields 103. Fixating ring 102 according to the specific implementation, is formed by two semi-cylindrical halves that are secured together via their respective circumferential ends 215 by attachment bolts 216 to form an annular structure. An axially upper attachment rim 211 projects radially outward from an axially upper region of ring 102 and a corresponding axially lower rim 212 projects radially outward from an axially lower region of ring 102. Lower rim 212 is configured for positioning to sit on top of an axially upper rim 107 of spider 100 with a lower spider rim 106 configured for mounting on top of a lower shell of the gyratory crusher (not shown). Fixating ring 102 is secured to the spider rim 107 via attachment bolts 213. Additionally, upper fixating rim 211 provides a mounting flange to support a material feed hopper (not shown) secured to rim 211 via corresponding attachment bolts 213 received through holes 214 distributed circumferentially around each rim 211, 212. Accordingly, fixating ring 102 is configured to sit axially between the uppermost material feed hopper (not shown) and spider 100. Ring 102 comprises a generally radially outward facing surface 209 and a corresponding radially inward facing surface 210. Each of the spider shields 103, 104 is secured to ring 102 via contact with the ring inward facing surface 210 and respective attachment bolts 217 that project radially through ring 102 and each shield 103, 104. Accordingly, shields 103, 104 are demountably secured to shield 103 so as to extend and project radially inward from the ring inward facing surface 210.

Figure 3:
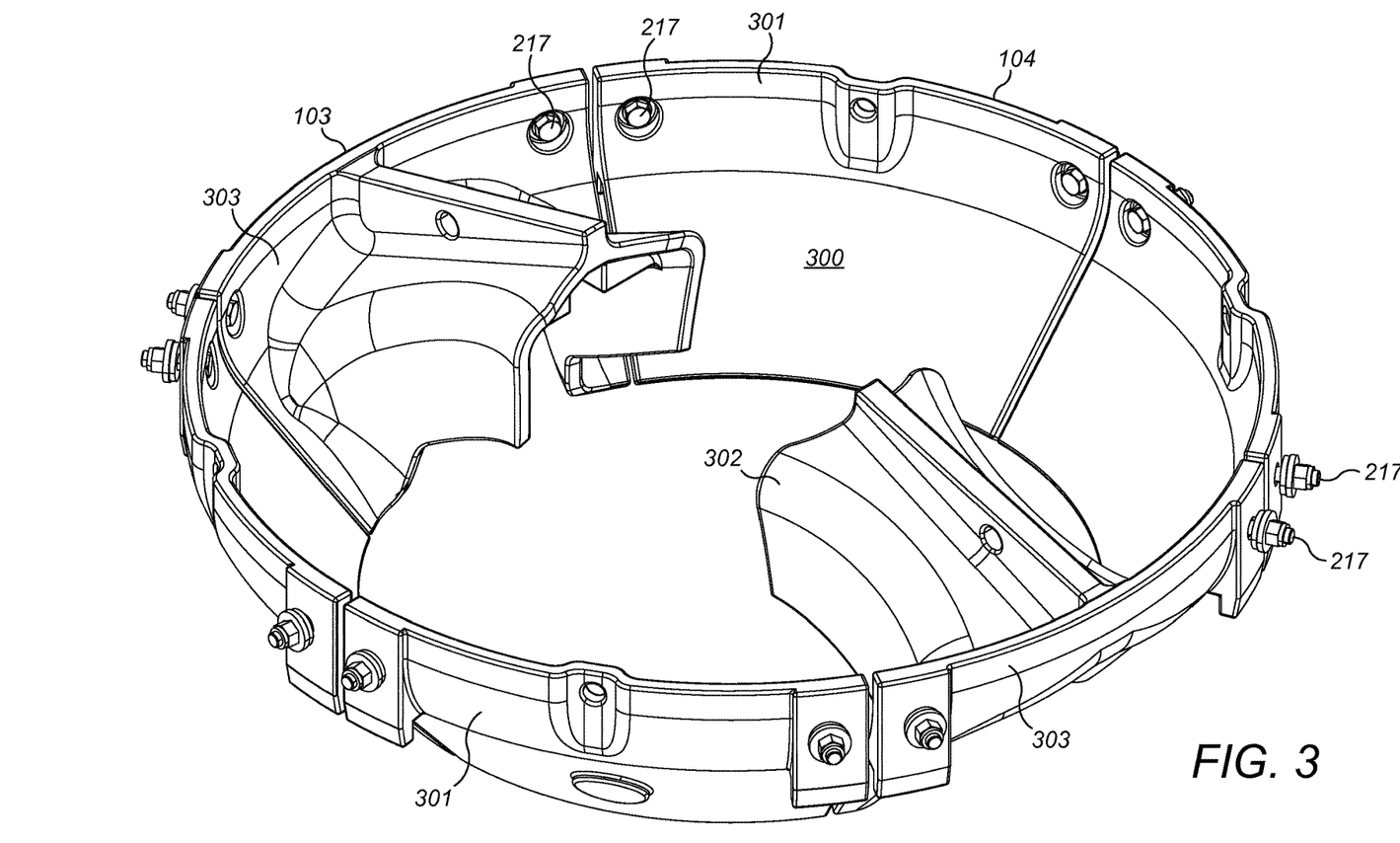
FIG. 3 is a perspective view of the protection assembly isolated from the spider according to a specific implementation of the present invention.
Figure 4:
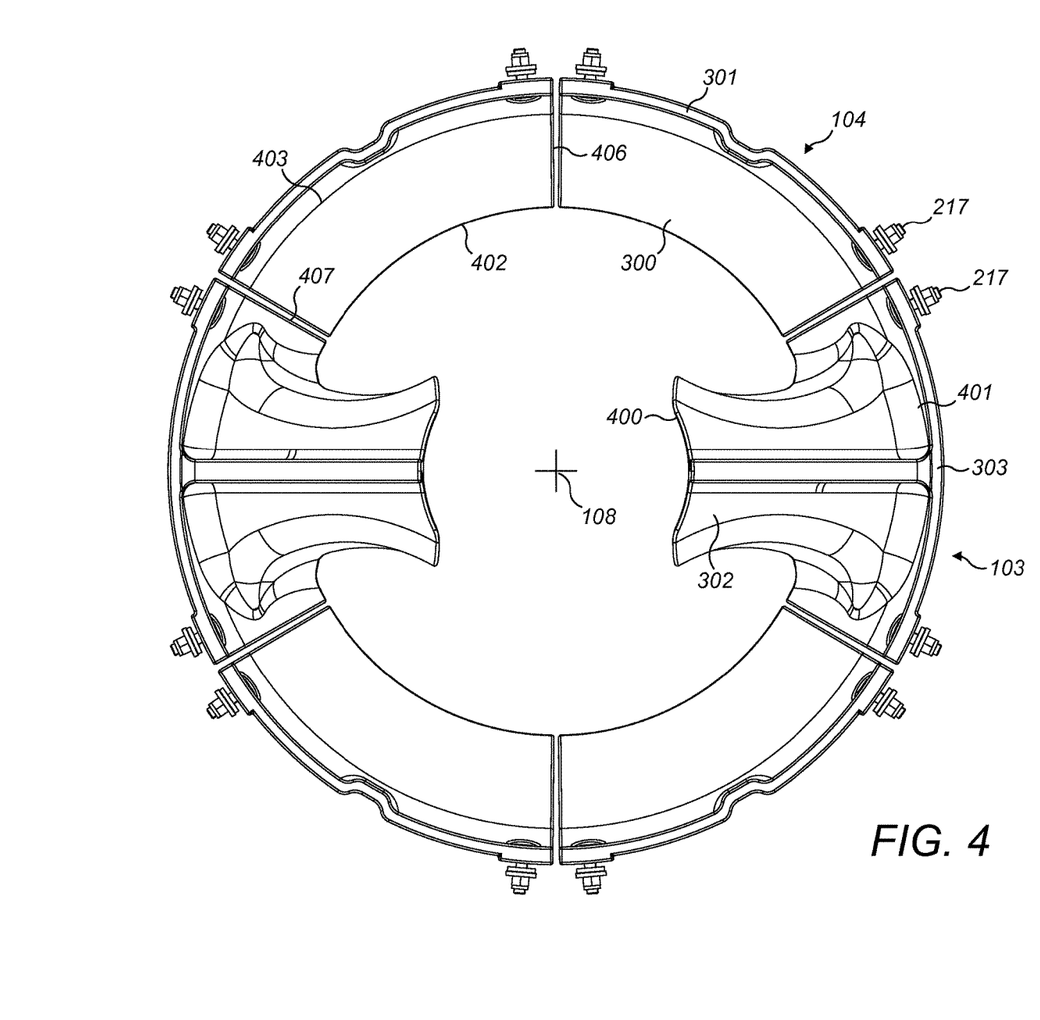
FIG. 4 is a plan view of the protection assembly of FIG. 3.

Referring to FIGS. 3 and 4, the spider protection assembly 101 may be considered to comprise a generally annular configuration being formed from four individual spider wall shields 104 and two diametrically opposed spider arm shields 103. The wall shields 104 are arranged in pairs such that the arm shields 103 are positioned circumferentially between each pair of wall shields 104. Each wall shield 104 comprises a spider protection wall 300 that is orientated to be declined relative to axis 108 and to slope downwardly relative to a rear wall indicated generally by reference 301 where the rear wall 301 represents an axially uppermost part of wall shield 104. Additionally, each arm shield 103 comprises a radially extending tunnel indicated generally by reference 302 that projects radially inward from a rear wall indicated generally by reference 303. Tunnel 302 comprises a radially innermost end 400 and a radially outermost end 401 positioned at rear wall 303. Tunnel inner end 400 is configured for positioning over the radially inner part 205 of spider arm 200 whilst tunnel outer end 401 is configured for positioning over spider arm outer region 206. Similarly, wall 300 of shield 104 is configured for positioning over spider wall 201 such that wall lowermost edge 402 is configured for positioning at the lowermost edge 207 of spider wall 201 whilst an upper region 403 of shield wall 300 is configured for positioning at the upper edge 208 of spider wall 201.

As illustrated in FIG. 4, each wall shield 104 comprises a pair of lengthwise end edges 406 and each arm shield 103 comprises a corresponding pair of lengthwise end edges 407 such that edges 406, 407 are configured to be positioned in near touching contact and opposed to one another to form the generally annular protection assembly 101.

Figure 5:
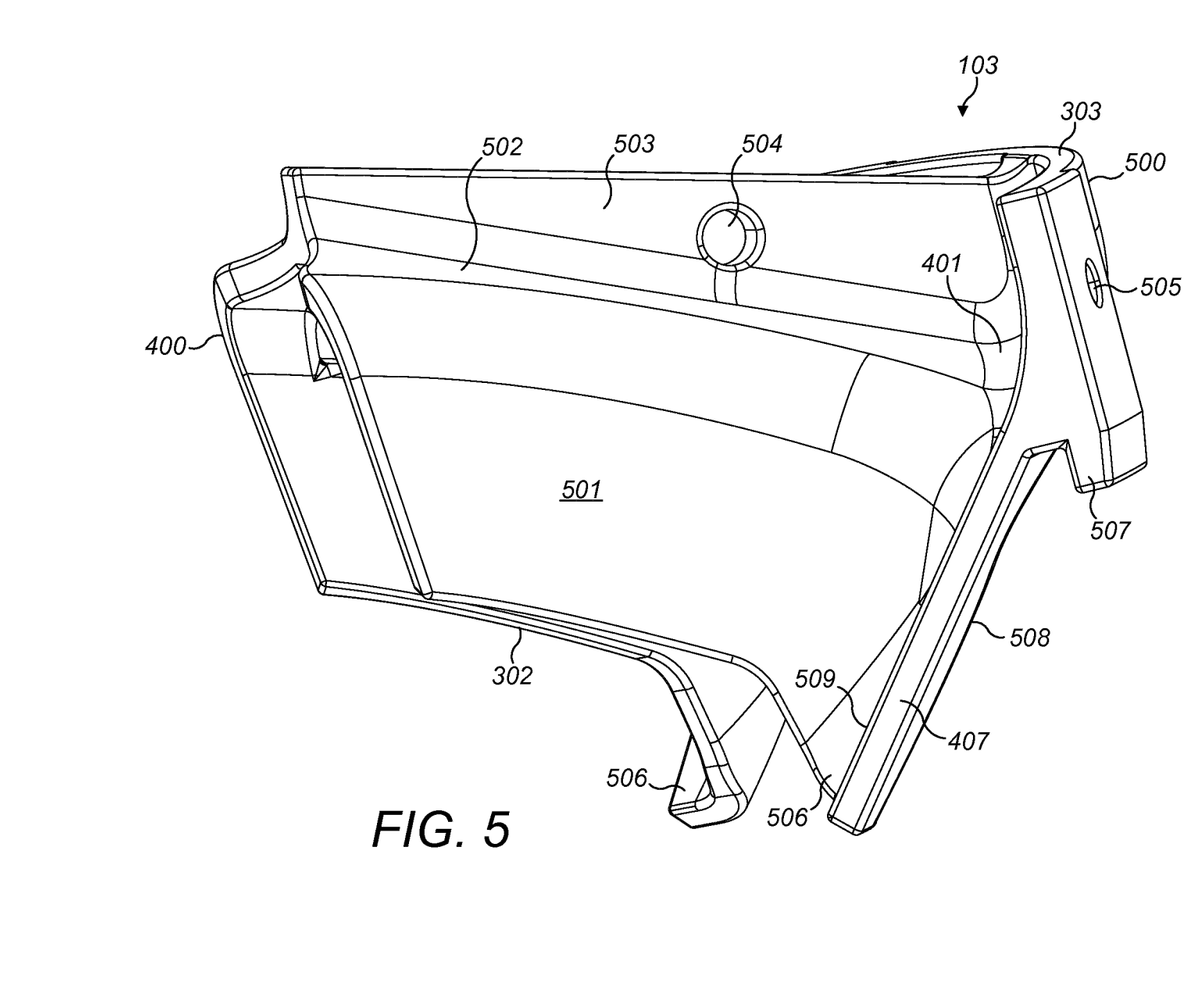
FIG. 5 is a side perspective view of a component of the protection assembly of FIG. 4 intended for positioning over a spider arm according to a specific implementation of the present invention.
Figure 6:
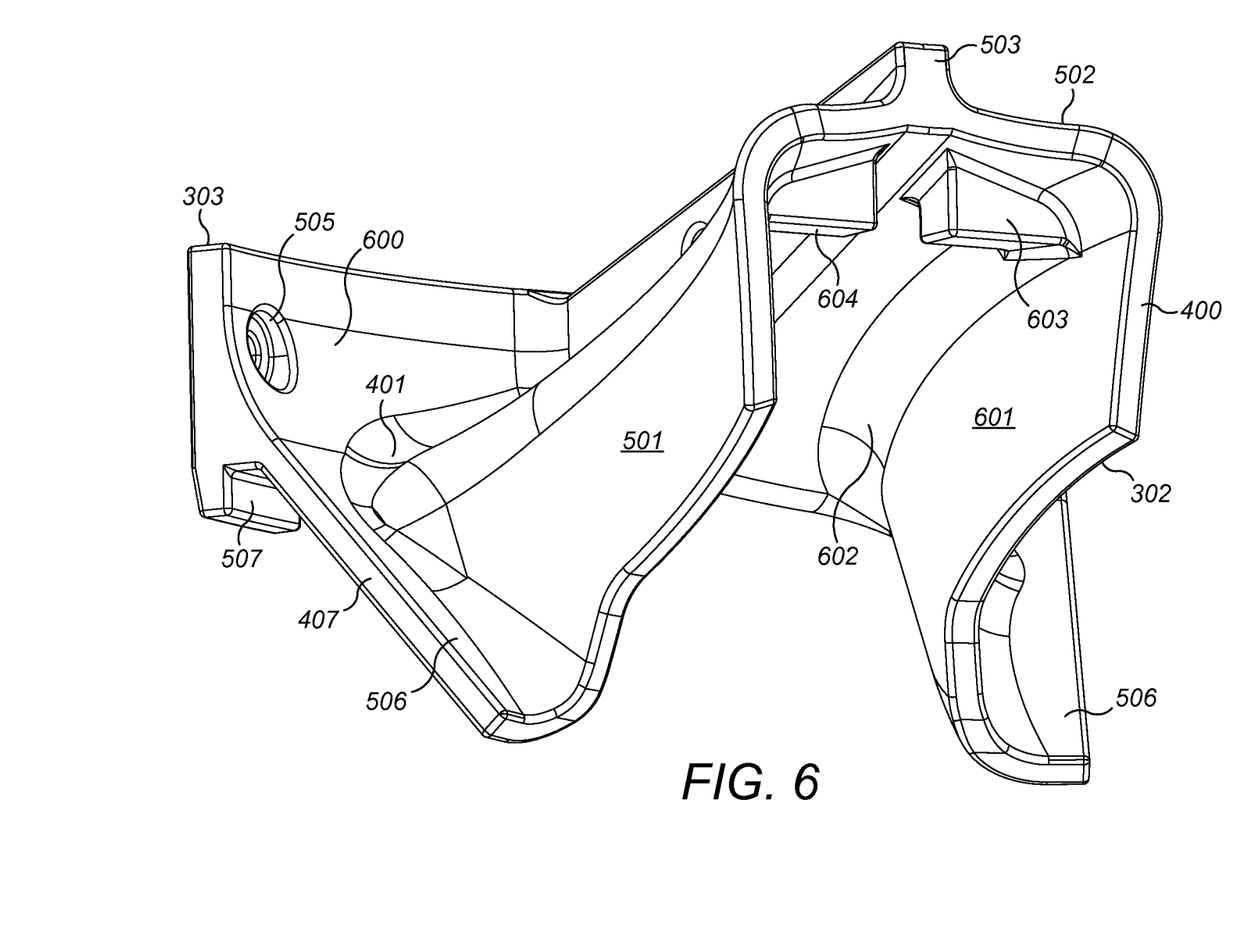
FIG. 6 is an underside perspective view of the spider arm shield of FIG. 5.
Figure 7:
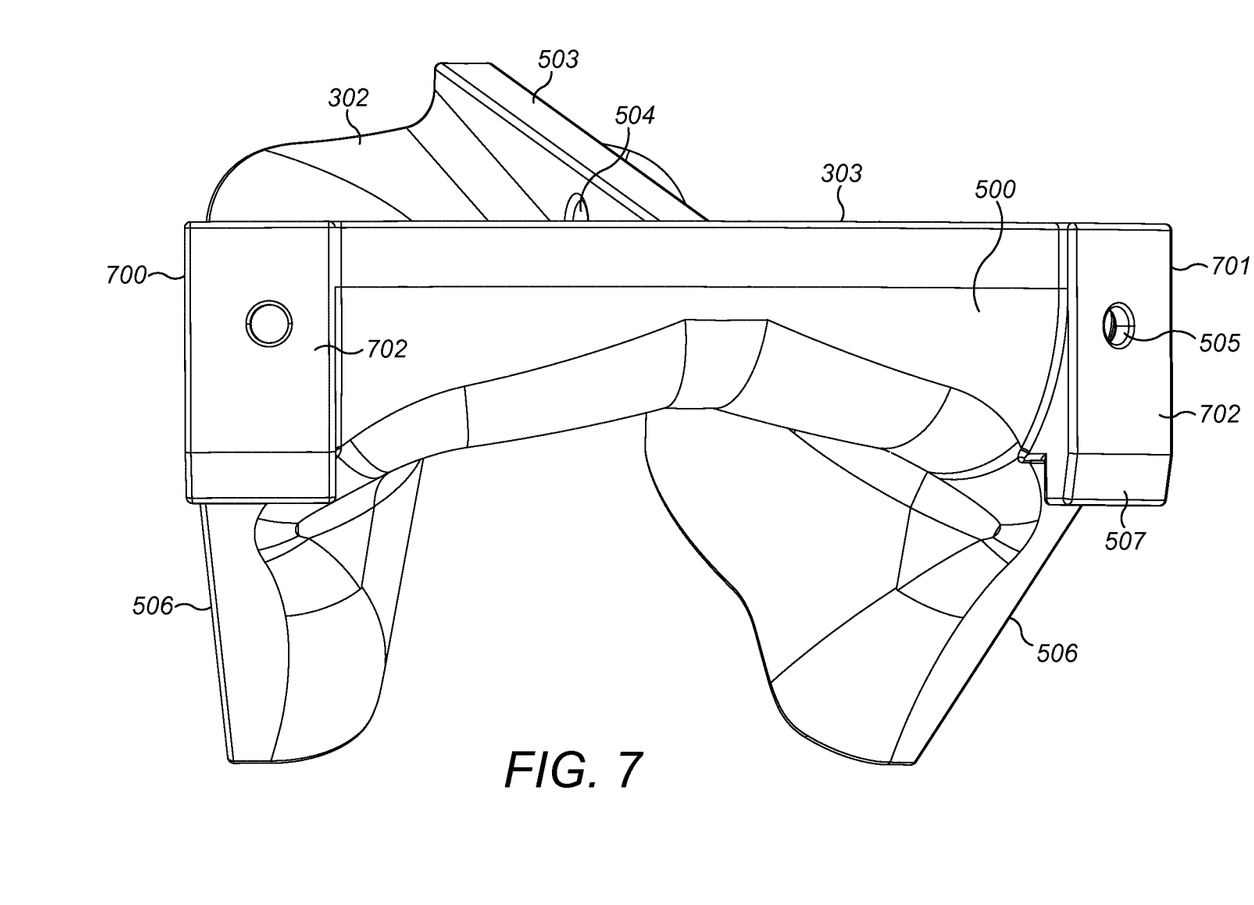
FIG. 7 is a rear perspective view of the arm shield of FIG. 6.

Referring to FIGS. 5 to 7 each arm shield tunnel 302 comprises side walls 501 projecting axially downward from a roof 502. Accordingly, inner surface 601 of side walls 501 is configured for positioning against the spider arm side faces 202 whilst an inner roof surface 602 is configured for positioning opposed to spider arm upper face 203. A pair of locating feet 603 project axially downward from roof surface 602 and comprise lowermost abutment faces 604 to contact a raised flange 218 projecting radially upward from spider arm upper face 203 at radially inner end 205. The locating feet 603 are spaced apart in a circumferential direction relative to axis 108. A ridge 503 projects axially upward from roof 502 and extends the radial length of tunnel 302 between radially inner and outer ends 400, 401. An aperture 504 is provided through ridge 503 to allow shield 103 to be attached to a lifting crane to raise and lower shield 103 relative to spider 100. Aperture 504 is positioned at the approximate mass centre of shield 103 between tunnel inner end 400 and rear wall 303 such that shield 103 is configured to be suspended in the orientation of FIG. 5 aligned with the orientation of spider arm 200.

Tunnel 302 is generally curved along its length between ends 400, 401 (in a radial direction) such that tunnel 302 flares circumferentially outward at radially outer end 401. Accordingly, tunnel 302 at end 401 is curved so as to terminate at a skirt 506 that is aligned generally transverse (including perpendicular) to the main length of tunnel 302. Accordingly, skirt 506 is curved to extend in a general circumferential direction of spider wall 201 so as to sit opposed and to spider wall 201 circumferentially either side of spider arm 200. Skirt 506 represents the circumferential ends of arm shield 103 comprising edges 407. Edges 407 are aligned to be declined relative to axis 108 at the same angled orientation as spider walls 201. Accordingly, tunnel 302 at the radially outermost end 401 projects axially downward and circumferentially outward to form skirt 506. An axially lower region of skirt 506 is configured to be positioned at the lower annular edge 207 of spider wall 201. An axially upper region of skirt 506 and the radially outer end 401 of tunnel 302 terminates at shield rear wall 303. Wall 303 is generally curved in the axial direction so as to provide a smooth transition into tunnel 302 and skirt 506. Skirt 506 comprises a radially inward facing surface 509 and a radially outward facing surface 508 with surface 508 configured for positioning in contact with spider wall surface 204. Additionally, rear wall 303 is curved in a circumferential direction to correspond to the curvature of the inner surface 210 of fixating ring 102. Rear wall 303 comprises a radially inward facing surface 600, a radially outward facing surface 500 and an attachment flange 702 that projects radially outward from wall outer surface 500 at each lengthwise end 700, 701 of rear wall 303. Each flange 702 is terminated at its axially lowermost end by an anchorage foot 507. Foot 507 represents an axially extending abutment projecting downwardly from rear wall 303 to be positioned radially outside skirt 506 and tunnel 302. Each foot 507 is configured to locate onto the upper annular rim 107 of spider 100. Accordingly, arm shield 103 is configured to seat onto spider 100 via contact with feet 603 locating onto flange 218 and feet 507 locating onto rim 107. A rear surface of each flange 702 is configured to extend generally parallel to axis 108 and in close touching contact with the radially inward facing surface 210 of fixating ring 102. An aperture 505 extends through rear wall 303 and in particular each attachment flange 702 to receive attachment bolt 217 to releasably secure shield 103 to fixating ring 102 surface 210. Accordingly, the pair of arm shields 103 and the fixating ring 102 are configured to form a unitary structure that may be raised and lowered as a single modular body to and from spider 100.

Figure 8:
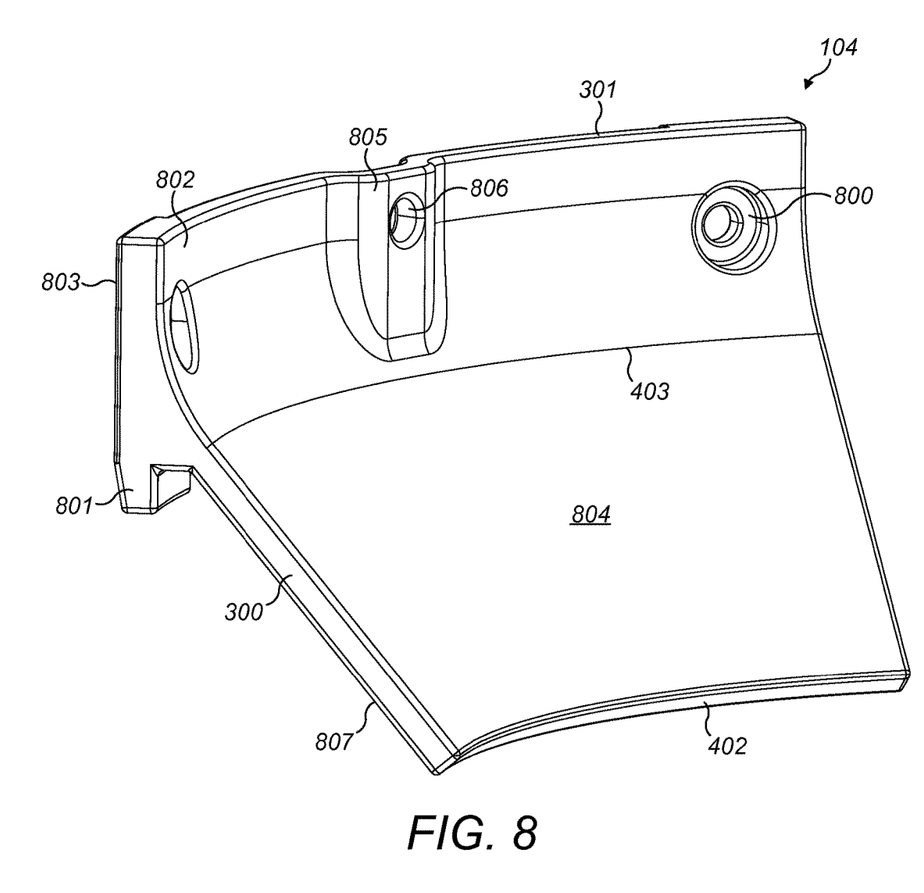
FIG. 8 is a perspective view of a spider wall shield for positioning over the inward facing surface of a spider and forming a part of the spider protection assembly of FIG. 4 according to a specific implementation of the present invention.
Figure 9:
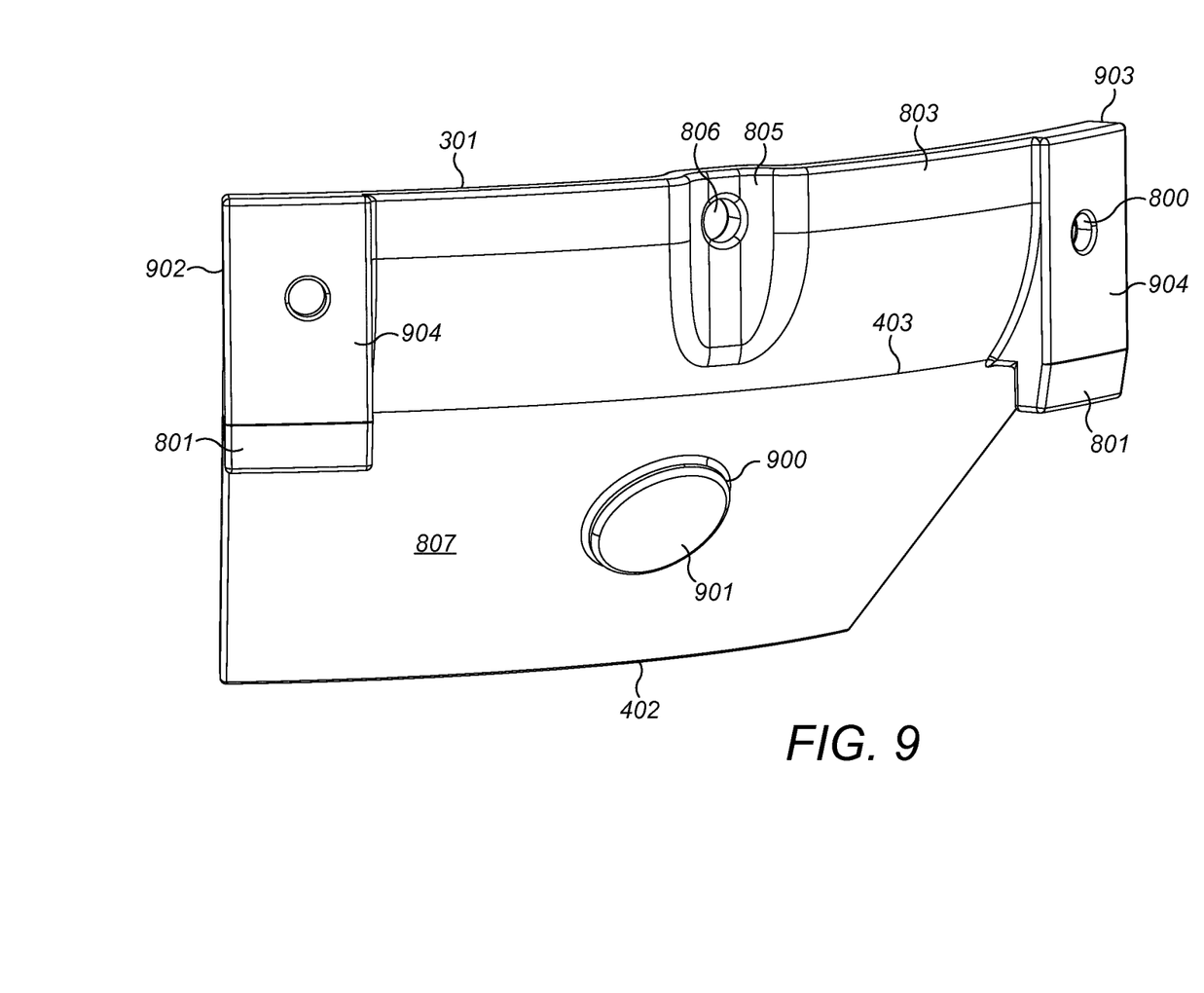
FIG. 9 is a rear perspective view of the spider wall shield of FIG. 8.
Figure 10:
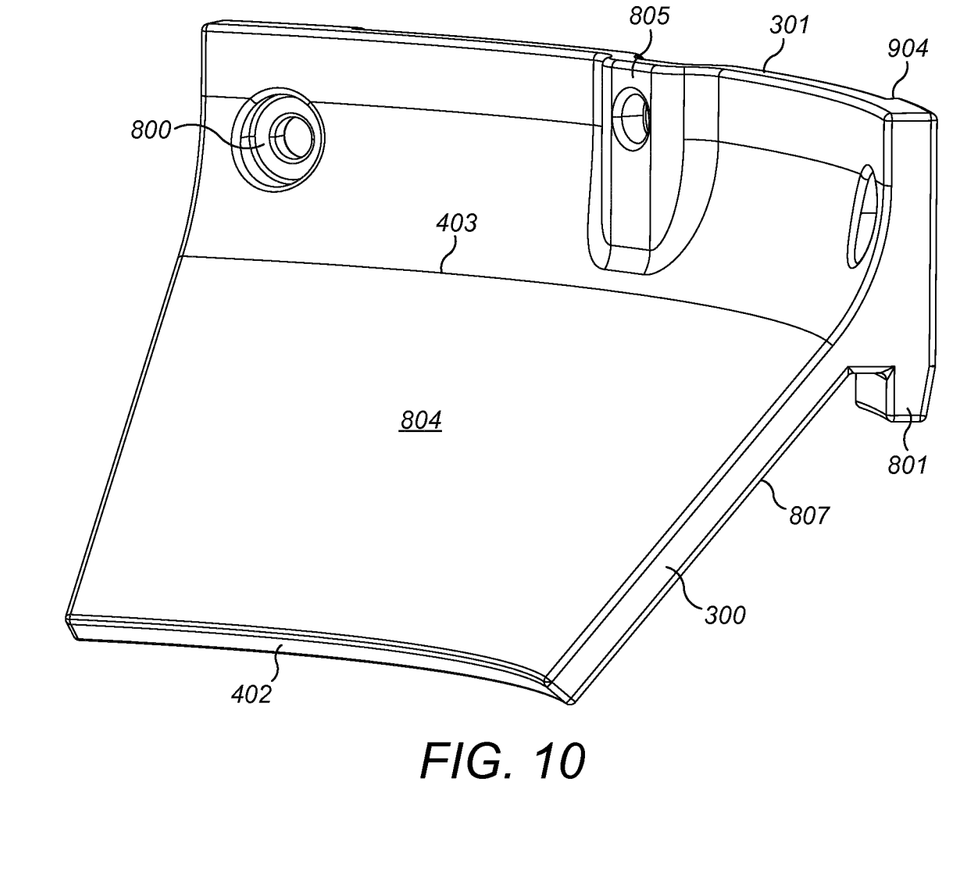
FIG. 10 is a further perspective view of the spider wall shield of FIG. 9.

Referring to FIGS. 8 to 10, shield protection wall 300 comprises a radially inward facing surface 804 and a radially outward facing surface 807. Surface 807 is configured for positioning opposed to spider wall surface 204. Accordingly, shield protection wall 300 is curved in a circumferential direction between circumferential ends 406. Wall 300 is orientated to extend at a transverse angle to a generally upright rear wall 301 that comprises a section that is aligned parallel to axis 108. To provide an appropriately contoured material contact surface (to facilitate the axially downward flow of material into the crusher), wall surface 804 and a radially inward facing surface 802 of rear wall 301 represents a single seamless inward facing surface. That is, the junction region 403 in the axial direction between rear wall 301 and protection wall 300 is curved. Rear wall 301 comprises a radially outward facing surface 803 having a length extending between first and second ends 902, 903. Rear wall 301 is curved along its length between ends 902, 903 so as to be arcuate and having a curvature corresponding to the curvature of fixating ring 102 and spider upper rim 107. Rear wall 301 comprises a pair of respective attachment flanges 904 that project radially outward at each lengthwise end 902, 903. Each flange 904 is terminated at its axially lowermost end by a locating foot 801. Each foot 801 projects axially downward to the rear of the generally declined protection wall. A rear surface of each flange 904 is configured to extend generally parallel to axis 108 and in close touching contact with the radially inward facing surface 210 of fixating ring 102. An aperture 800 extends radially through rear wall 301 and each flange 904 to receive respective attachment bolts 217 to secure shield 104 to the inward facing surface 210 of fixating ring 102.

A locating foot 900 projects radially outward from the radially outward facing (underside) surface 807 of protection wall 300. Foot 900 is generally disc shaped having a circular downward facing surface 901 configured to locate in touching contact against the spider wall surface 204. Foot 900 is positioned at a central location within wall 300 axially intermediate lower edge 402 and upper region 403. Accordingly, shield 104 is configured to be self-supporting on spider 100 via contact between feet 801 at spider rim 107 and foot 900 at spider wall 201.

Each shield rear wall 301 comprises a mid-region 805 that is curved radially inward to form a pocket at the region radially between outward facing surface 803 of wall 301 and the radially inward facing surface 210 of ring 102. An aperture 806 extends through region 805 to provide a means of attaching a lifting device (not shown) to shield 104. Each shield 104 is secured in position via releasable attachment to fixating ring 102 using attachment bots 217 inserted through apertures 800. Accordingly, the ring 102 and the four spider wall shield 104 are connectable to form a unitary body that may be collectively raised and lowered with the spider 100 relative to the crusher (not shown).

The invention claimed is:

1. A gyratory crusher spider wall shield arranged to be releasably mounted to a radially inward facing face of a spider positioned on a top shell of a gyratory crusher, the wall shield comprising:
    a spider protection wall arranged to be positioned over the inward facing face of the spider;
    a rear wall extending upwardly from and projecting transverse to the spider protection wall, the rear wall having an inner face orientated radially inwards and an outer face orientated radially outward, the rear wall representing a radially outermost part of the wall shield;
    at least one locating foot projecting downwardly from the spider protection wall to contact the inward face of the spider; and
    at least one attachment element provided at the rear wall to attach the wall shield to a fixating ring via the outer face, the fixating ring being positionable on top of and at a perimeter of the spider to surround at least part of the spider and the wall shield.

2. The shield as claimed in claim 1, further comprising at least one locating foot projecting downwardly from a lower portion of the rear wall to contact an upper region of the spider.

3. The shield as claimed in claim 1, wherein the rear wall is curved along its length forming a curvature, the curvature corresponding to an arc of a circle.

4. The shield as claimed in claim 3, further comprising a first and second locating foot provided respectively at a first and a second end of the rear wall.

5. The shield as claimed in claim 4, wherein the at least one attachment element includes a hole.

6. The shield as claimed in claim 5, further comprising a first and a second hole positioned respectively towards or at each of the first and second ends of the length of the rear wall.

7. The shield as claimed in claim 6, wherein the spider protection wall and the rear wall are formed integrally.

8. The shield as claimed in claim 1, wherein a length of the wall shield in a circumferential direction decreases from an axially uppermost region positioned at the rear wall and an axially lowermost end positioned at the spider protection wall.

9. The shield as claimed in claim 1, wherein the rear wall includes an aperture, notch or hooked member to enable the shield to be connected to a lifting device.

10. A gyratory crusher spider protection assembly comprising:
    a plurality of wall shields arranged to be releasably mounted over an inward face of a spider positioned on a top shell of a gyratory crusher, each wall shield including a spider protection wall arranged to be positioned over the inward face of the spider, a rear wall extending upwardly from and projecting transverse to the spider protection wall, the rear wall having an inner face orientated radially inwards and an outer face orientated radially outward, the rear wall representing a radially outermost part of the wall shield, and at least one attachment element provided at the rear wall to attach the wall shield to the outer face;
    a fixating ring arranged to be positioned on top of and at a perimeter of the spider to extend circumferentially around at least part of the spider and the wall shields, the at least one attachment element attaching the wall shield to the fixating ring via the outer face; and
    a plurality of fixation elements securable respectively to each of the attachment elements to releasably fix the wall shields to the fixating ring such that the wall shields and the fixating ring are configured to form a unitary assembly.

11. The assembly as claimed in claim 10, further comprising anchorage elements to secure the fixating ring to an upper region of the spider at the perimeter of the spider.

12. The assembly as claimed in claim 10, further comprising a plurality of locating feet extending downwardly from the rear wall to contact the upper region of the spider at the perimeter of the spider.

13. The assembly as claimed in claim 10, further comprising a plurality spider arm shields arranged to be releasably mounted to a plurality of spider arms that extend radially outward from a central hub that forms a part of the spider, each one of the arm shields including a tunnel having a roof and sidewalls for positioning over and at least partially around each spider arm to protect upper and side faces of each arm, the tunnel having a radially inner end arranged to be positioned at the central hub and a radially outer end arranged to be positioned at a perimeter of the spider, a rear wall projecting upwardly from the radially outer end of the tunnel, the rear wall having an inner face orientated radially inwards towards the tunnel and an outer face orientated radially outward away from the tunnel, the rear wall representing a radially outermost part of the arm shield, and a plurality of attachment elements provided at the rear wall to attach the arm shields to the fixating ring via the outer face, such that the arm shields, the wall shields and the fixating ring are configured to form a unitary assembly.

14. A gyratory crusher comprising:
    a spider having a central hub and a plurality of spider arms extending radially outward from the central hub towards an outer perimeter of the spider;
    a material feed hopper mounted axially above the spider; and a spider protection assembly including a plurality of wall shields arranged to be releasably mounted over an inward face of a spider positioned on a top shell of a gyratory crusher, each wall shield including a spider protection wall arranged to be positioned over the inward face of the spider, a rear wall extending upwardly from and projecting transverse to the spider protection wall, the rear wall having an inner face orientated radially inwards and an outer face orientated radially outward, the rear wall representing a radially outermost part of the wall shield, and at least one attachment element provided at the rear wall to attach the wall shield the outer face, and a fixating ring being arranged to be positioned on top of and at a perimeter of the spider to extend circumferentially around at least part of the spider and the wall shields, the at least one attachment element attaching the wall shield to the fixating ring via the outer face, and a plurality of fixation elements securable respectively to each of the attachment elements to releasably fix the wall shields to the fixating ring such that the wall shields and the fixating ring are configured to form a unitary assembly, wherein the fixating ring is positioned axially intermediate the spider and the material feed hopper.

* * * * *